United States Patent [19]
Andrewsen

[11] 3,923,894
[45] Dec. 2, 1975

[54] PROCESS FOR SEPARATING ETHYLENE DIAMINE FROM CAUSTIC AND SODIUM CHLORIDE

[75] Inventor: Harry W. Andrewsen, San Rafael, Calif.

[73] Assignee: Chevron Research Company, San Francisco, Calif.

[22] Filed: Mar. 16, 1972

[21] Appl. No.: 235,184

[52] U.S. Cl. .......... 260/583 N; 260/583 P; 423/499
[51] Int. Cl.² ........................................ C07C 85/26
[58] Field of Search ...................... 260/583 N, 583 P

[56] References Cited
UNITED STATES PATENTS

| | | | |
|---|---|---|---|
| 3,394,186 | 8/1968 | Muhlbauer | 260/583 N |
| 3,448,152 | 6/1969 | Milligan et al. | 260/583 N |
| 3,454,645 | 8/1969 | Barrlia et al. | 260/583 N |

OTHER PUBLICATIONS
Linke, Solubilities–Inorganic & Metal–Organic Compounds pp. 964–965 Vol. II 1965.

*Primary Examiner*—Lewis Gotts
*Assistant Examiner*—D. R. Phillips
*Attorney, Agent, or Firm*—G. F. Magdeburger; R. H. Davies; D. L. Hagmann

[57] ABSTRACT

A process for: (1) separating sodium chloride; and (2) quantitatively separating ethylene diamine from a mixture comprising water, caustic, ethylene diamine and sodium chloride, is disclosed, comprising:
1. evaporating the ethylene diamine and a portion of the water at a temperature in the range of from about 150° to 300°F. and a pressure in the range of from about 1 to 12 psia, until
   a. the concentration of caustic in the remaining portion of the mixture is 40 to 75 percent by weight based on the caustic and water content of the remaining portion of the mixture; and
   b. a portion of said sodium chloride crystallizes in the remaining portion of said mixture; and
2. separating crystallized sodium chloride from the remaining portion.

Preferably at least a portion of the mixture from which the crystallized sodium chloride is separated is recycled to the evaporation step.

6 Claims, 1 Drawing Figure

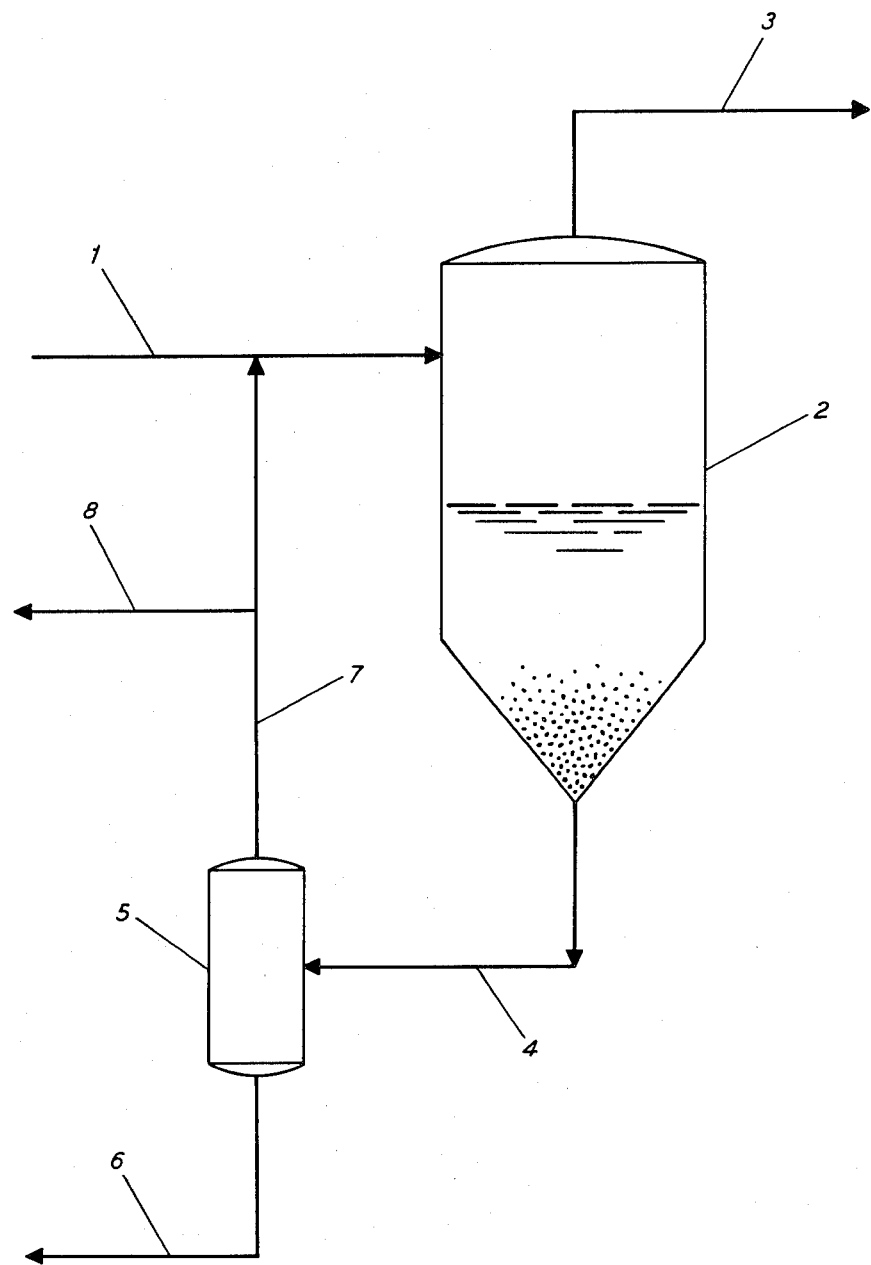

PROCESS FOR SEPARATING ETHYLENE DIAMINE FROM CAUSTIC AND SODIUM CHLORIDE

BACKGROUND OF THE INVENTION

1. Field of the Invention

In the preparation of high molecular weight hydrocarbyl-substituted ethylene diamines, such as those taught in U.S. Pat. Nos. 3,438,757, 3,565,804, and 3,574,576, and U.S. application Ser. No. 31,298, filed Apr. 28, 1970, the spent wash solution utilized in purifying the substituted ethylene diamine contains unreacted ehtylene diamine, sodium chloride, caustic, and generally alkanol.

Due to the evermore stringent regulations on waste water disposal, a process for quantitatively separating the ethylene diamine from the sodium chloride and caustic solution is needed so that the sodium chloride can be disposed of without contamination by the ethylene diamine. This invention is directed to a process for quantitatively separating ethylene diamine and any alkanol present from a caustic and sodium chloride mixture, while simultaneously crystallizing sodium chloride from the mixture.

2. Description of the Prior Art

It is known to separate amines from an aqueous-based mixture by making the mixture alkaline by adding caustic or the like. See, for example, U.S. Pat. Nos. 3,394,186 and 3,454,645.

However, the quantitative separation of ethylene diamine from an aqueous solution while simultaneously crystallizing sodium chloride by use of a concentrated caustic solution is believed novel. This combined processing step provides an efficient method for disposing of sodium chloride without environmental contamination, while providing substantially complete recovery of ethylene diamine for subsequent reuse.

SUMMARY OF THE INVENTION

A process is disclosed for: (1) separating sodium chloride; and (2) quantitatively separating ethylene diamine from a mixture comprising water, caustic, ethylene diamine and sodium chloride, comprising:

1. evaporating the ethylene diamine and a portion of the water at a temperature in the range of from about 150° to 300°F. and a pressure in the range of from about 1 to 12 psia, until
   a. the concentration of caustic in the remaining portion of the mixture is 40 to 75 percent by weight based on the caustic and water content of the remaining portion of the mixture; and
   b. a portion of said sodium chloride crystallizes in the remaining portion of said mixture; and
2. separating crystallized sodium chloride from the remaining portion.

Preferably at least a portion of the mixture from which the crystallized sodium chloride is separated is recycled to the evaporation step.

DETAILED DESCRIPTION OF THE INVENTION

The process of the subject invention provides a method for: (1) separating sodium chloride, and (2) quantitatively separating ethylene diamine from a mixture comprising water, ethylene diamine (EDA), caustic, sodium chloride, and in some cases minor amounts of an alkanol. Briefly, the process comprises the stpes of: (a) evaporating the ethylene diamine, any alkanol present, and a portion of the water, at a reduced pressure and an elevated temperature, until (1) the concentration of caustic in the remaining portion of the mixture is 40 to 75 percent by weight based on the caustic and water content of the remaining portion of the mixture; and (2) a portion of the sodium chloride crystallizes in the remaining portion of the mixture; and (b) separating cyrstallized sodium chloride from the remaining portion of the mixture. Preferably at least a portion of the mixture from which the crystallized sodium chloride is separated is recycled to the evaporation step.

The invention will be better understood by a consideration of the drawing, which is a schematic flow diagram of the process.

DETAILED DESCRIPTION OF THE DRAWING

Referring now to the drawing, which represents a preferred embodiment of the invention, the mixture to be separated is introduced via line 1 into evaporator-crystallizer 2. Evaporator-crystallizer 2 is operated at an elevated temperature and reduced pressure, causing the volatiles (ethylene diamine, water, and the alkanol) to be taken off overhead via line 3. The crystallized sodium chloride settles to the bottom of evaporator-crystallizer 2 and is drawn off, together with a portion of the concentrated caustic solution via line 4. The crystallized sodium chloride in the concentrated caustic solution flows by line 4 to solids separator 5, where the crystallized sodium chloride particles are separated from the caustic solution and sent to waste disposal via line 6. The concentrated caustic solution is recycled to evaporator-crystallizer 2 via line 7 and line 1. A portion of the concentrated caustic solution is drawn off via line 8 and may be recycled to be used in washing the substituted ethylene diamine or may be used to neutralize acidic gases such as HCl and the like. Similarly, line 3, taking the ethylene diamine, water, and any alkanol present, passes overhead to an EDA recovery process section wherein the EDA is separated from the water and alkanol and is recycled for use in the formation of substituted ethylene diamine.

PROCESS CONDITIONS

The evaporation-crystallization is carried out at elevated temperatures and reduced pressures. Temperatures in the range of from about 150° to 300°F., preferably 230° to 270°F., and most preferably about 250°F., are utilized. Pressures in the range of from 1 to 12 psia, preferably about 2 to 8 psia, and more preferably about 5 psia, are utilized. Equilibrium conditions are maintained, with an average caustic concentration level of from about 40 to 75 percent by weight, based on the combined weight of the water and the caustic present in the liquid phase, preferably 50 to 65 %, and more perferably about 58 %.

Compositions treated by the process of the present invention will typically contain (on a weight basis) about 5 to 20 % EDA, 0 to 2% alkanol (the amount is not critical in any way, since substantially all of it goes overhead), 1 to 2% caustic, 5 to 10% sodium chloride, and the balance water.

Higher concentrations of sodium chloride will generally not be present, since the solubility of the sodium chloride in the mixture is limited.

Higher concentrations of EDA are not desirable, since as the concentration goes up the completeness of separation decreases.

The alkanol, when present in the mixture will generally be n-butanol. However, other alkanols such as methanol, ethanol, propanol, n-pentanol, and the $C_6$-$C_8$ alcohols may also be present. The alkanols are present since high molecular weight hydrocarbyl-substituted ethylene diamine acts as a surfactant when contacted with water-forming emulsions. By utilizing n-butanol or the like, these emulsions can be broken or coalesced. Substantially all of the alkanol is evaporated and taken off overhead.

Similarly, substantially all of the ethylene diamine is removed in the overhead stream. A quantitative separation of the ethylene diamine from the concentrated caustic solution is obtained. By "quantitative separation of the ethylene diamine" is meant that less than 1.0 % by weight, prefereably less than 0.2%, ethylene diamine is present in the concentrated caustic solution, based on the combined weight of the caustic, water and ethylene diamine.

The separator used to separate the crystallized sodium chloride from the concentrated caustic solution can be any conventional apparatus, for example a centrifuge, a filter press, or a settling tank. However, it is preferred that a centrifuge or filter be utilized, since the drier the sodium chloride the lower the quantity of ethylene diamine (which is already at very low levels) becomes. Sodium chloride can then be taken up in water and discarded as a salt solution without the danger of contamination of natural salt waterways—bays, the ocean, and the like.

The process is preferably carried out on a continuous basis. However, it can be operated on a batch basis if desired. In either case, during startup the level of caustic must be built up to the specified 40 to 75% range to obtain the desired sodium chloride crystallization and quantitative removal of ethylene diamine overhead.

As previously pointed out, a portion of the concentrated caustic solution is drawn off either continuously or intermittently, since it builds up as the process is carried out. It can be recycled to be used in the washing operation of the high molecular weight hydrocarbyl-substituted ethylene diamine, or used to neutralize acidic gases and the like.

The ethylene diamine-water- (and generally) alkanol overhead is separated, using conventional techniques. However, the subsequent separation of the ethylene diamine, water and butanol forms no part of this invention, this invention being directed to the crystallization and disposal of sodium chloride and to the quantitative separation of ethylene diamine from the sodium chloride and caustic present in the wash water.

The invention will be still better understood by reference to the following example, which is offered by way of illustration and not by way of limitation.

EXAMPLE

A vessel containing the mixture set forth in Table I below was evacuated to 5.0 psia and heated to 250°F., and maintained until steady-state conditions were reached. The following cuts were taken off overhead:
1. 7.83 parts EDA, 1.5 parts $H_2O$
2. 8.65 parts EDA, 2.9 parts $H_2O$
3. ≈1.0 part EDA, ≈0.3 part $H_2O$ The vessel then had an equilibrium makeup of ≈2.5 parts EDA, 41.3 parts $H_2O$, 46 parts NaOH, and 3.6 parts NaCl (dissolved portion only).

TABLE I

| Parts by Weight | | | |
|---|---|---|---|
| EDA | $H_2O$ | NaOH | NaCl |
| 20 | 46 | 46 | 6* |

*solid and dissolved

A solution containing 30.2 parts EDA, 163.6 parts $H_2O$ and 2.1 parts n-butanol was then fed continuously to the vessel at a low rate, while maintaining the temperature at 250°F. and the pressure at 5 psia. All material which evaporated was taken off overhead.

The flask solution at the end of the test was analyzed with the following results:

TABLE II

| Parts by Weight | | | | |
|---|---|---|---|---|
| EDA | $H_2O$ | n-butanol | NaOH | NaCl |
| <0.16 | 32.9 | — | 46 | 3.4* |

*dissolved

From the example it can be seen that operating with a typical wash feed (on a solids-free basis) containing EDA and other materials of equal or greater volatility in an aqueous solution with caustic present, the caustic becomes sufficiently concentrated to drive off substantially all the EDA.

It is apparent that many widely different embodiments of the invention may be made without departing from the scope and spirit thereof; and, therefore, it is not intended to be limited except as indicated in the appended claims.

What is claimed is:

1. The process of: (1) separating sodium chloride, and (2) quantitatively separating ethylene diamine from a mixture comprising water, caustic, ethylene diamine and sodium chloride, which comprises:
   a. evaporating ethylene diamine and water from said mixture at a temperature in the range of from about 150° to 300°F. and a pressure in the range of from about 1 to 12 psia, said evaporation of diamine being substantially quantitative until
      i. the concentration of caustic in the remaining portion of said mixture is 40 to 75 weight percent based on the caustic and water content of said remaining portion, and
      ii. a portion of said sodium chloride crystallizes in said remaining portion of said mixture; and
   b. separating crystallized sodium chloride from said remaining portion.

2. The process of claim 1, with the additional step of recycling to the evaporation step at least a portion of the composition from which said crystallized sodium chloride was separated.

3. The process of claim 1, wherein said mixture comprising water, caustic, ethylene diamine and sodium chloride further comprises an alkanol.

4. The process of claim 1 wherein said process is continuous.

5. The process of claim 1, wherein ethylene diamine and water are evaporated from said mixture comprising water, caustic, ethylene diamine and sodium chloride at a temperature in the range of from about 210° to 270°F., and a pressure in the range of from about 2 to 8 psia, until in said remaining portion the concentration of caustic is 50 to 65 weight percent and the concentration of ethylene diamine is not more than 0.2 weight percent, in each case based on the caustic and water content of said remaining portion.

6. The process of claim 5 wherein said process is continuous.

* * * * *